United States Patent
Fridman et al.

(10) Patent No.: US 9,342,479 B2
(45) Date of Patent: May 17, 2016

(54) SYSTEMS AND METHODS OF DATA EXTRACTION IN A VECTOR PROCESSOR

(75) Inventors: Jose Fridman, Newton, MA (US); Ajay Anant Ingle, Austin, TX (US); Deepak Mathew, Acton, MA (US); Marc M. Hoffman, Mansfield, MA (US); Michael John Lopez, Walpole, MA (US)

(73) Assignee: QUALCOMM Incorporated, San Diego, CA (US)

( * ) Notice: Subject to any disclaimer, the term of this patent is extended or adjusted under 35 U.S.C. 154(b) by 893 days.

(21) Appl. No.: 13/592,617

(22) Filed: Aug. 23, 2012

(65) Prior Publication Data
US 2014/0059323 A1    Feb. 27, 2014

(51) Int. Cl.
  *G06F 9/00*   (2006.01)
  *G06F 15/80*  (2006.01)
  *G06F 9/30*   (2006.01)

(52) U.S. Cl.
  CPC ........ *G06F 15/8084* (2013.01); *G06F 9/30018* (2013.01); *G06F 9/30032* (2013.01); *G06F 9/30036* (2013.01); *G06F 9/30109* (2013.01)

(58) Field of Classification Search
  CPC .......................... G06F 9/30018; G06F 15/8084
  See application file for complete search history.

(56) References Cited

U.S. PATENT DOCUMENTS

| | | | |
|---|---|---|---|
| 4,825,361 A | 4/1989 | Omoda et al. | |
| 4,918,600 A | 4/1990 | Harper, III et al. | |
| 5,669,013 A | 9/1997 | Watanabe et al. | |
| 6,820,195 B1 | 11/2004 | Shepherd | |
| 7,430,631 B2 | 9/2008 | Van Berkel et al. | |
| 7,610,466 B2 | 10/2009 | Moyer | |
| 8,600,401 B2 * | 12/2013 | Kumar | 455/456.1 |
| 2002/0031220 A1 * | 3/2002 | Lee et al. | 380/37 |
| 2004/0054877 A1 | 3/2004 | Macy et al. | |
| 2007/0106883 A1 | 5/2007 | Choquette | |
| 2008/0114969 A1 | 5/2008 | Gonion et al. | |
| 2009/0172348 A1 | 7/2009 | Cavin | |

FOREIGN PATENT DOCUMENTS

EP   0068764 A2   1/1983

OTHER PUBLICATIONS

Anjum O., et al., "State of the art baseband DSP platforms for Software Defined Radio: A survey", EURASIP Journal on Wireless Communications and Networking, vol. 2011, No. 1, Jan. 1, 2011, p. 5, XP055053153, ISSN: 1687-1499, DOI: 10.1049/ip-cdt:20030833.
Freescale Semiconductor Ltd: "AltiVec (TM) Technology Programming Interface Manual", Jun. 1, 1999, XP055019778.
International Search Report and Written Opinion—PCT/US2012/052328—ISA/EPO—May 16, 2013.

(Continued)

*Primary Examiner* — Zachary K Huson
(74) *Attorney, Agent, or Firm* — Donald D. Min; Paul Holdaway

(57) ABSTRACT

Systems and methods of data extraction in a vector processor are disclosed. In a particular embodiment a method of data extraction in a vector processor includes copying at least one data element to a source register of a permutation network. The method includes reordering multiple data elements of the source register, populating a destination register of the permutation network with the reordered data elements, and copying the reordered data elements from the destination register to a memory.

26 Claims, 11 Drawing Sheets

(56) References Cited

OTHER PUBLICATIONS

Nilsson A., et al., "An 11 mm, 70 mW Fully Programmable Baseband Processor for Mobile WiMAX and DVB-T/H in 0.12m CMOS", IEEE Journal of Solid-State Circuits, IEEE Service Center, Piscataway, NJ, USA, vol. 44, No. 1, Jan. 1, 2009, pp. 90-97, XP011241032, ISSN: 0018-9200, DOI: 10.1109/JSSC.2008.2007167 p. 3, right-hand column, last paragraph.

Tyler J., et al., "AltiVec<TM>: bringing vector technology to the PowerPC<TM> processor family", Performance, Computing and Communications Conference, 1999 IEEE Intern Ational Scottsdale, AZ, USA Feb. 10-12, 1999, Piscataway, NJ, USA, IEEE, US, Feb. 10, 1999, pp. 437-444, XP010323652, ISBN: 978-0-7803-5258-2.

\* cited by examiner

SYSTEMS AND METHODS OF DATA EXTRACTION IN A VECTOR PROCESSOR

I. FIELD

The present disclosure is generally related to data extraction in a vector processor.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Also, such wireless telephones can process executable instructions, including software applications, such as a web browser application, that can be used to access the Internet. As such, these wireless telephones can include significant computing capabilities.

Some devices, such as wireless telephones, may include a vector processor. Vector processors may be efficient at handling groups of data elements as a unit in data operations. For example, an N-element vector processor may perform memory load and store operations by moving N elements at once between a source register and a memory, or the vector processor may perform N mathematical operations (e.g., addition, multiplication) on N elements as one operation. Assuming a single data element is a word of size 32 bits, the source register of the vector processor may be a size of N words.

In a memory system, words may be referred to by their addresses. For example, word a(j) is stored at address j, word a(j+1) is stored at address j+1, and so on. Memory systems that include vector processors may be designed as aligned memory such that groups of N words [a(j+N−1), . . . , a(j+1), a(j)] are stored starting at address j, such that the property j modulo N=0 is satisfied. This is referred to as an aligned vector memory access. To illustrate, in a 4-word vector processor, load and store operations may only be valid when addressing [a(3), a(2), a(1), a(0)] or [a(7), a(6), a(5), a(4)].

When implementing an operation in a vector processor, the above described aligned memory structure may need to be reflected in the operation (i.e., the operation may need to conform to the fixed memory structure). However, many operations are not regular and may not conform well to a fixed memory of size N, resulting in inefficient implementations. For example, many operations used in orthogonal frequency division multiplexing (OFDM) systems operate on data elements that are non-contiguous. In OFDM systems, the transmission spectrum is divided into sub-carriers. In order to make use of frequency diversity, at a particular point in time only a subset of the sub-carriers is assigned to a transmission. The selected sub-carriers are in general non-contiguous, and as a result, processing takes place on non-contiguous data elements. For example, if the sub-carriers are stored in a linear array A with index i (i.e., A(i)), in order to obtain estimates of a channel, pilot processing may be applied to a set of data elements consisting of every third sub-carrier (e.g., A(i), A(i+3), A(i+6), . . . ). As another example, an OFDM operation may require the extraction of a contiguous group of 12 or 6 samples from an arbitrary starting index.

Accordingly, it would be desirable to enhance the efficiency of implementing operations that are not regular on an N-word vector processor.

III. SUMMARY

Data extraction in a vector processor may use a permutation network to reorder data elements such that the reordered data elements may be stored to a memory as part of a single operation. The data elements may be copied to a source register and reordered based on a control register, where the control register may contain indexes corresponding to locations of selected data elements in the source register. The control register may be used to select data elements in any order. Alternatively, the data elements may be selected using a bit-mask, where each bit in the bit-mask indicates whether a corresponding data element in the source register is to be copied to the memory. The bit-mask may be used for in-order data extraction. The selected data elements may be copied from multiple registers and spliced together. The selected data elements may be copied to the memory based on an unaligned store pointer. The unaligned store pointer may indicate a predicated store operation, where a first set of the selected data elements may be copied to a first line in the memory and a second set of the selected data elements may be copied to a next line in the memory based on the unaligned store pointer.

In a particular embodiment, a method of data extraction in a vector processor includes copying at least one data element to a source register of a permutation network. The method also includes reordering multiple data elements of the source register, populating a destination register of the permutation network with the reordered data elements, and copying the reordered data elements from the destination register to a memory. The resulting data elements may be in any arbitrary order.

In another particular embodiment, a method of data extraction in a vector processor with aligned memory includes copying at least one data element to a source register of a permutation network. The method also includes using a bit-mask to determine whether to select one or more data elements from the source register and, in response to determining to select the one or more data elements, populating a destination register of the permutation network with the selected one or more in-order data elements. The method further includes copying the selected one or more data elements from the destination register to a memory according to an unaligned store pointer that indicates a predicated store operation.

In another particular embodiment, a method of data extraction in a vector processor includes copying at least one data element from two or more first registers to a register to be used as an input of a permutation network, where copying the at least one data element is based on a first control register that indicates, for each location of the register, which of the two or more first registers is to be used to populate the location of the register. The method also includes selecting data elements of the register using a second control register, where the second control register indicates indexes of the register corresponding to locations of the data elements in the register, and populating a destination register of the permutation network with the selected data elements. The method further includes copying the selected data elements from the destination register to a memory.

In another particular embodiment, a computer-readable medium stores instructions that, when executed by a processor, cause the processor to copy at least one data element to a source register of a permutation network. The instructions, when executed by the processor, also cause the processor to reorder multiple data elements of the source register and to populate a destination register of the permutation network with the reordered data elements. The instructions, when executed by the processor, further cause the processor to copy the reordered data elements from the destination register to a memory.

In another particular embodiment, an apparatus includes a source register configured to receive at least one data element, a destination register, and a permutation network. The permutation network is configured to reorder multiple data elements of the source register and to populate the destination register with the reordered data elements.

One particular advantage provided by at least one of the disclosed embodiments is enabling data extraction of non-contiguous data elements, for example based on an OFDM data extraction pattern, in a single operation on an N-word vector processor.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
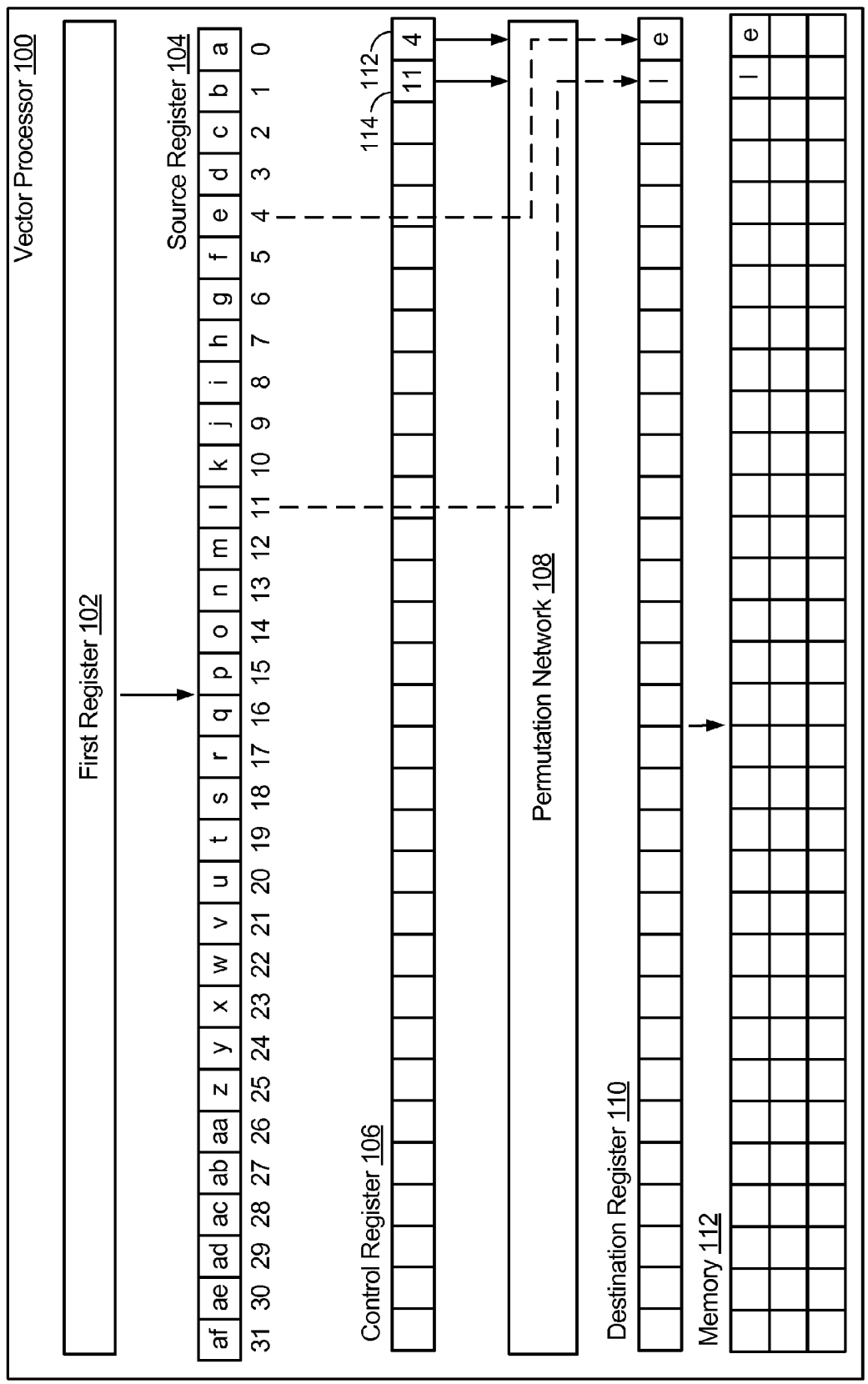
FIG. 1 is a diagram of a particular illustrative embodiment of a vector processor, a permutation network, and a control register.

FIG. 1 is a block diagram of a particular illustrative embodiment of a vector processor 100. The vector processor 100 may include a permutation network 108 that receives data from one or more source registers (e.g., an illustrative source register 104) and that outputs data to one or more destination registers (e.g., an illustrative destination register 110). One or more control registers (e.g., an illustrative control register 106) may control the operation of the permutation network 108. For example, the permutation network 108 may store data from the source register 104 in the destination register 110 in a reordered fashion, where a specific reordering pattern applied by the permutation network 108 is defined by the control register 106.

In a particular embodiment, the source register 104 may receive data from a data source, such as a memory (e.g., random access memory (RAM)) or a register. For example, in FIG. 1, the source register 104 of the permutation network 108 receives data from a first register 102. Similarly, although not shown in FIG. 1, the destination register 110 may output data to a destination, such as a memory (e.g., RAM) or a register (e.g., the first register 102 or another register of the vector processor 100). Data elements may be stored into and copied from the first register 102 on a per-byte, per half-word, per word, and/or per double-word basis.

The permutation network 108 is operable to reorder any data element (e.g., byte, half-word, word, or double-word) of the source register 104 into a different data element of the destination register 110. In a particular embodiment, the permutation network 108 includes various multiplexers, where control signals to the multiplexers enable such reordering. For example, each multiplexer may be configurable, via a control signal, to copy data from a particular location of the source register 104 to a different location of the destination register 110. In a particular embodiment, the control signals for the multiplexers of the permutation network 108 are generated based on data in the control register 106.

During operation, at least one data element from the first register 102 may be copied to the source register 104. For example, as shown in FIG. 1, the 32 data elements "a, b, c, . . . ae, af," each having a size of one word, may be copied from the first register 102 to the source register 104. In a particular embodiment, one word may occupy four bytes. In other embodiments, word size may vary based on design or architecture of the vector processor 100. A reordering pattern may be loaded into the control register 106. In a particular embodiment, the reordering pattern may be programmed via user input or retrieved from a table. For example, in FIG. 1, the control register 106 stores a first value 112 of "4" and a second value 114 of "11" in the two least significant bytes of the control register 106 located at indexes 0 and 1 of the control register 106.

A position of a particular index value in the control register 106 may indicate a position (e.g., index) of the corresponding data element in the destination register 110. For example, as shown in FIG. 1, the permutation network 108 reorders the data element "e" from index 4 of the source register 104 to index 0 of the destination register 110. Similarly, the permutation network 108 reorders data "l" from index 11 of the source register 104 to index 1 of the destination register 110, as shown.

The vector processor 100 may thus be operable to perform reordering of data elements using the permutation network 108. In particular, the vector processor 100 may support reordering in accordance with complex arbitrary patterns. For example, when the control register 106 stores indexes "0, 3, 6, . . . ," the permutation network 108 may perform in-order extraction of every third data element from the source register 104. Such a reordering pattern may be useful when the vector processor 100 is included in a wireless communication device or component thereof, such as a fourth generation (4G) long term evolution (LTE) modem. For example, such a reordering pattern may be used to extract pilot tones according to an LTE pilot extraction pattern.

Figure 2:
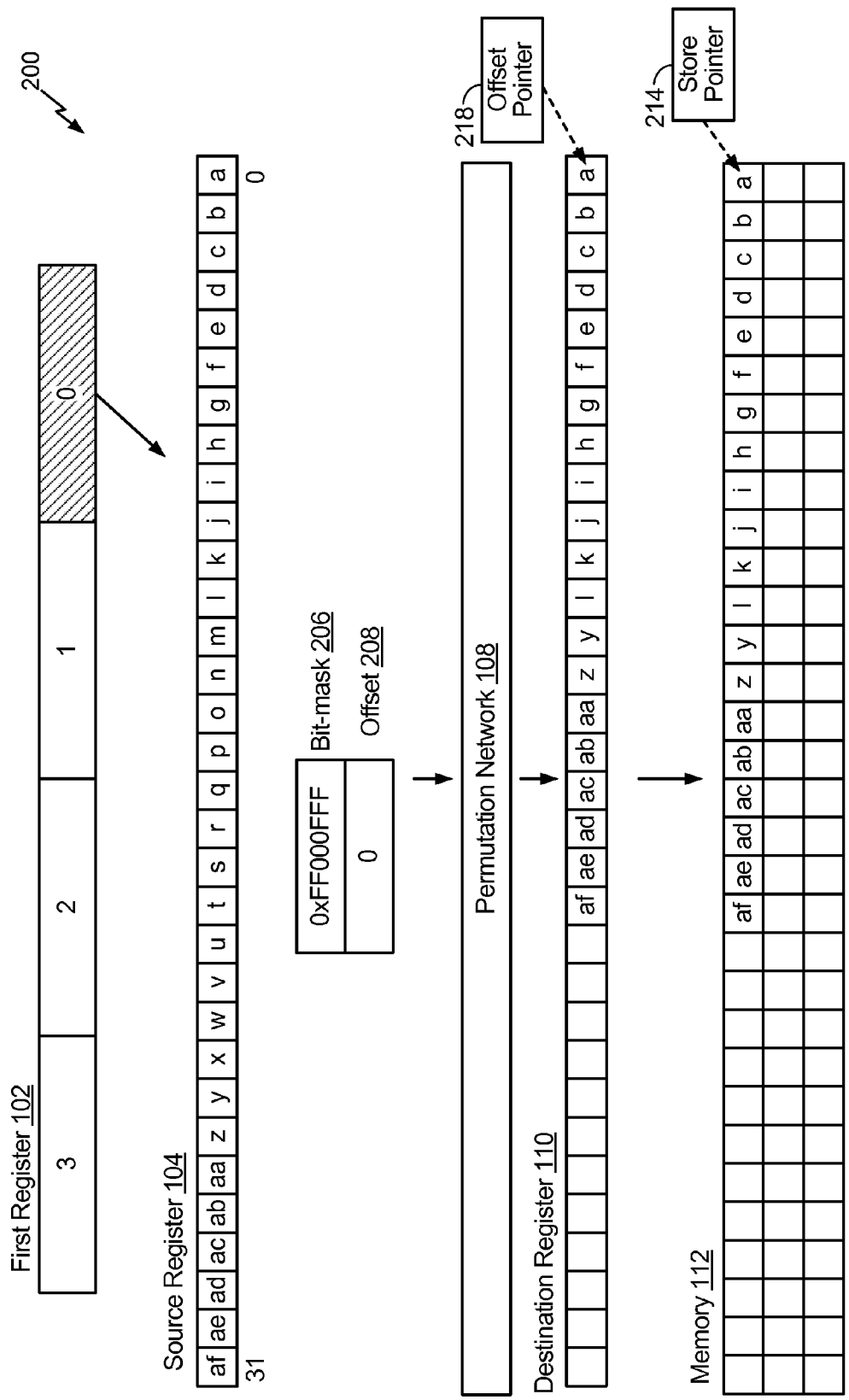
FIG. 2 is a block diagram of a particular illustrative embodiment of the vector processor of FIG. 1 and a bit-mask at a first stage of data extraction.
Figure 3:
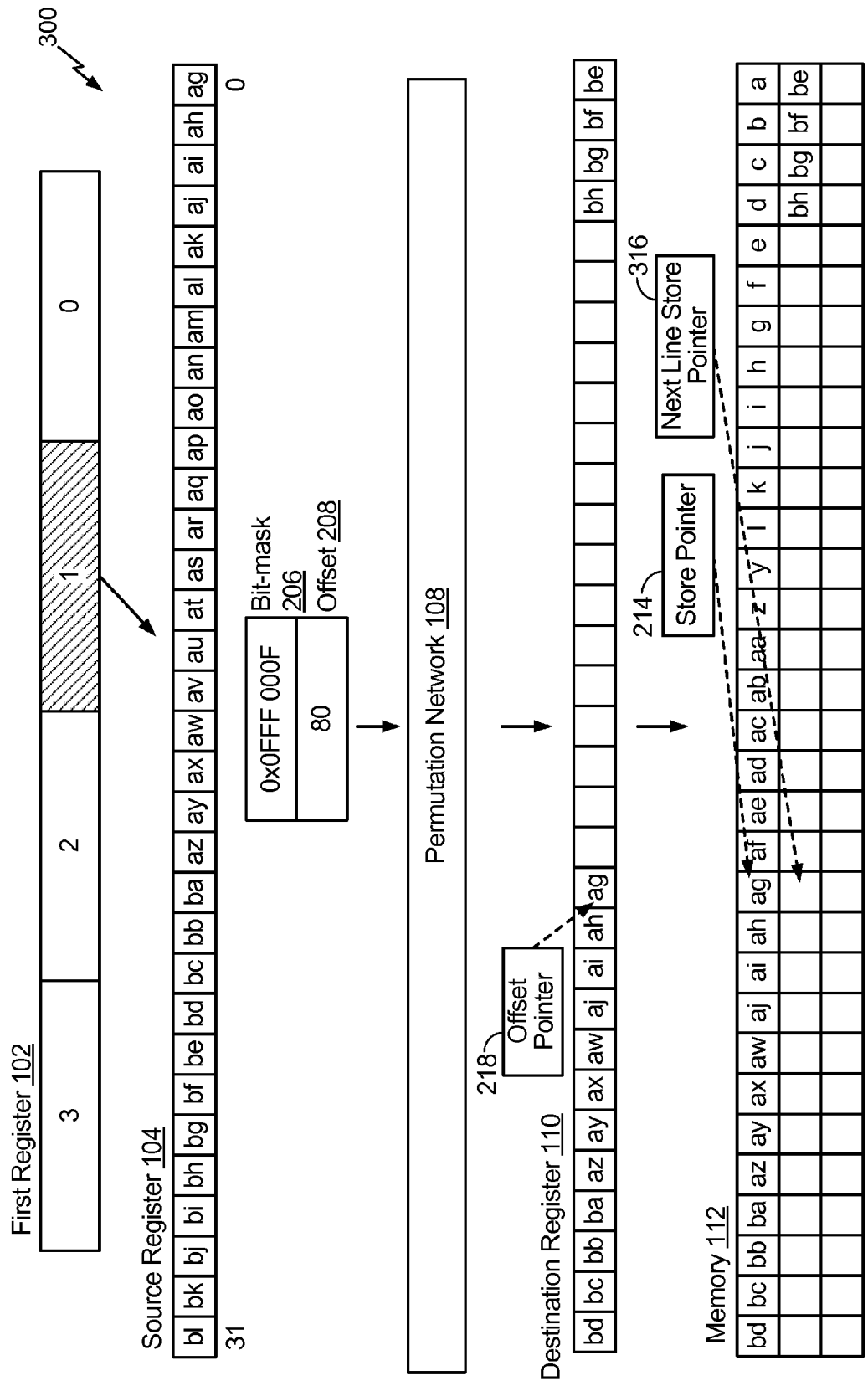
FIG. 3 is a block diagram of a particular illustrative embodiment of the vector processor of FIG. 1 and the bit-mask of FIG. 2 at a second stage of data extraction.
Figure 4:
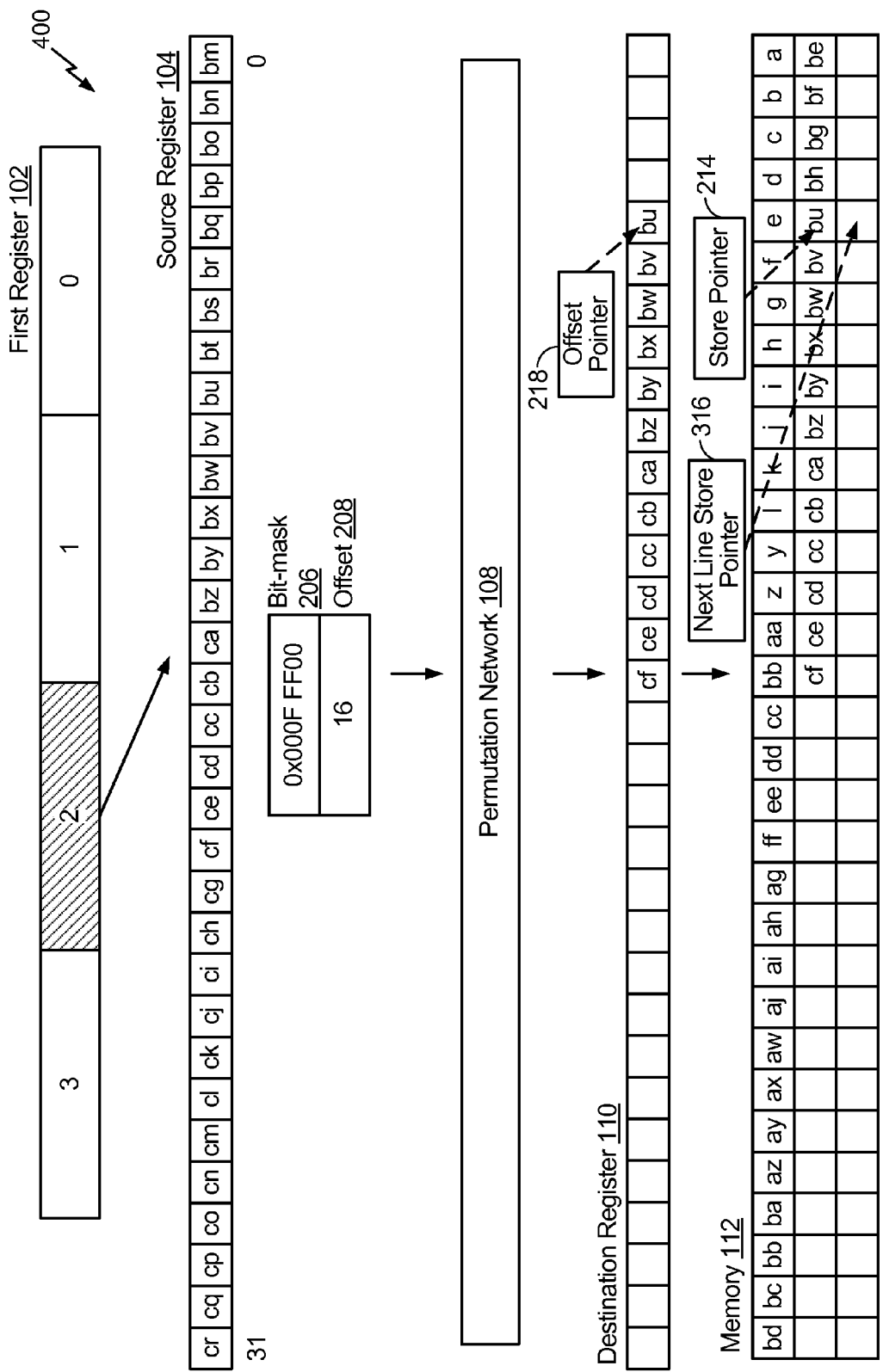
FIG. 4 is a block diagram of a particular illustrative embodiment of the vector processor of FIG. 1 and the bit-mask of FIG. 2 at a third stage of data extraction.

However, when performing in-order extraction, the degree of arbitrariness afforded by the control register 106 may not be necessary. To enable faster processing, in an alternate embodiment, a bit-mask may be used to define a fixed extraction pattern instead of using a control register to define an arbitrary reordering pattern. For example, FIGS. 2-4 illustrate operation at the vector processor 100 of FIG. 1 based on a bit-mask 206 and an offset 208. FIG. 2 illustrates a first stage of such operation and is generally designated 200.

During operation, data stored in the first register 102 may be processed in order. For example, the data block designated "0" may be processed first, as shown in FIG. 2. The data block designated "0" may include data elements "a, b, c . . . ae, af."

The bit-mask 206 and the offset 208 may be programmed via user input or retrieved from memory (e.g., from a table stored in memory). In a particular embodiment, the bit-mask 206 and the offset 208 are stored in registers or a register pair of the vector processor. The bit-mask 206 may be used to determine whether to select data elements in the source register 104. When all bits in the bit-mask 206 have a first value (e.g., "0"), it may be determined that none of the data elements in the source register 104 are to be selected. In the embodiment illustrated in FIG. 2, the bit-mask 206 has a hexadecimal value of 0xFF000FFF, which is equal to a binary value of "1111 1111 0000 0000 0000 1111 1111 1111." Each particular bit in the bit-mask 206 may correspond to a particular location of the source register 104. For each bit in the bit-mask 206, a data element at the corresponding location in the source register 104 may be selected when the bit has a second value.

For example, as shown in FIG. 2, data in each index of the source register 102 corresponding to a "1" in the bit-mask 206 may be selected by the permutation network 108, but data in each index of the source register 104 corresponding to a "0" in the bit-mask 206 may not be selected. Thus, as shown in FIG. 2, the permutation network 108 may populate the destination register 110 with the twelve right-most data elements and the eight left-most data elements from the source register 102.

In a particular embodiment, the permutation network 108 may output extracted data elements to the destination register 110 based on an offset pointer 218 that depends on the value of the offset 208. To illustrate, the offset 208 may store the value 0, which may result in the offset pointer 218 pointing to index zero of the destination register 110, as shown.

In a particular embodiment, data from the destination register 110 may be copied to a memory 112 by performing an aligned store operation. The aligned store operation may be performed based on a store pointer 214. For example, as shown in FIG. 2, the twenty data elements "a, b, c, . . . l, y, z, aa, . . . ae, af" may be copied to the memory 112 at a position indicated by the store pointer 214.

FIG. 3 is a diagram of a second stage of operation at a vector processor that follows the first stage of operation illustrated in FIG. 2, and is generally designated 300.

After the twenty data elements "a, b, c, . . . l, y, z, aa, . . . ae, af" are copied to the memory 112, data block "1" of the first register 102 may be processed. The store pointer 214 may be updated to point to the position in memory immediately to the left of the data element "af" (i.e., byte position 80). As a result, the offset 208 may be equal to 80 (i.e., the seven least significant bits of the updated store pointer 214). As shown in FIG. 3, the bit-mask 206 may be updated to 0x0FFF000F.

During operation, the data block designated "1" in the first register 102 may be processed next, as shown in FIG. 3. The data block designated "1" may include data elements "ag, ah, ai, . . . bk, bl." The binary value of the bit-mask 206 is equal to "0000 1111 1111 1111 0000 0000 0000 1111." Thus, the permutation network 108 may populate the destination register 110 with data elements "ag . . . aj" and "aw . . . bh."

In a particular embodiment, the permutation network 108 may fill the destination register 110 with the data elements based on the offset pointer 218. The offset pointer 218 may indicate an offset position in the destination register 110. To illustrate, the offset 208 may be 80 (i.e., word position 20) indicating an offset position at index twenty of the destination register 110, as shown. As illustrated in FIG. 3, the destination register 110 may be filled with data elements starting at index twenty. In case of an overflow, any remaining data elements may be stored in the destination register 110 below index twenty. Thus, the data elements "be . . . bh" may be populated in word positions 0-3 of the destination register 110.

In a particular embodiment, data from the destination register 110 may be copied to the memory 112 by performing a predicated store operation that enables or inhibits stores on a per-data element (e.g., per word) basis. The predicated store operation may be performed based on the store pointer 214. The store pointer 214 is unaligned and may indicate the offset 208 to mask a partial store of the data elements. The data elements stored in the destination register 110 at positions equal to or higher than the offset position indicated by the offset pointer 218 (i.e., the data elements "ag . . . aj" and "aw . . . bd" may be copied to locations equal to or higher than the location indicated by the store pointer 214. The data elements stored in the destination register at positions lower than the offset position indicated by the offset pointer 218 (i.e., the data elements "be . . . bh") may be copied to the memory 112 at locations lower than indicated by a next line store pointer 316. In a particular embodiment, the next line store pointer 316 may be generated by adding a line size (e.g., 128 bytes, in FIG. 3) to the store pointer 214.

FIG. 4 is a diagram of a third stage of operation at a vector processor that follows the second stage of operation illustrated in FIG. 3, and is generally designated 400.

After the sixteen data elements "ag . . . aj, aw . . . az, ba . . . bh" are copied to the memory 112, data block "2" of the first register 102 may be processed. The store pointer 214 may be updated to point to the position in memory immediately to the left of the data element "bh" (i.e., byte position 144, which is binary 0 . . . 010010000). The least significant bits of the store pointer 214 may indicate an offset into a row of the memory 112. For example, when there are 128 byte positions, in each row of the memory 112, 7 bits (i.e., $2^7$=128) may indicate a byte offset into a row. The remaining bits of the store pointer 214 may indicate the row. For example, in the updated store pointer 214, the seven least significant bits (i.e., binary 0010000) indicate an offset of 16 bytes and the remaining bits (i.e., 0 . . . 01) indicate row 1 of the memory 112. As shown in FIG. 4, the bit-mask 206 may be updated to 0x000FFF00.

During operation, the data block designated "2" in the first register 102 may be processed, as shown in FIG. 4. The data block designated "2" may include data elements "bm, bn, bo, . . . cq, cr." The binary value of the bit-mask 206 is equal to "0000 0000 0000 1111 1111 1111 0000 0000." Thus, the permutation network 108 may populate the destination register 110 with data elements "bu . . . cf."

Data from the destination register 110 may then be copied to the memory 112. The data elements stored in the destination register 110 at positions equal to or higher than the offset position indicated by the offset pointer 218 (i.e., the data elements "bu . . . cf") may be copied to the memory 112 starting at the location indicated by the store pointer 214. The data elements stored in the destination register 110 at positions lower than the offset position indicated by the offset pointer 218 may be "rotated," i.e., copied to the memory 112 at locations lower than indicated by the next line store pointer 316. In case there is no overflow, the data elements copied to the next line may be overwritten during a subsequent write to the memory 112. The store operation to the next line may thus be considered a "speculative" store operation. Thus, explicit detection of an overflow may not be required, which may simplify logic and hardware used to support the described store operation.

The permutation network 108 may thus be operable to perform in-order extraction of data based on the bit-mask 206, as illustrated in FIGS. 2-4, instead of using the control register 106 of FIG. 1. In particular, the bit-mask 206 may provide a more compact form of expression than the control register 106. The control register 106 may be operable to create any output pattern such as changing the order of the data elements and repeating the data elements. However, in the context of orthogonal frequency-division multiplexing (OFDM), most operations may perform in-order data extraction and the extracted data elements may not need to be repeated. For example, using a bit-mask may improve the efficiency of extracting pilot tones according to an in-order LTE pilot extraction pattern.

Figure 5:
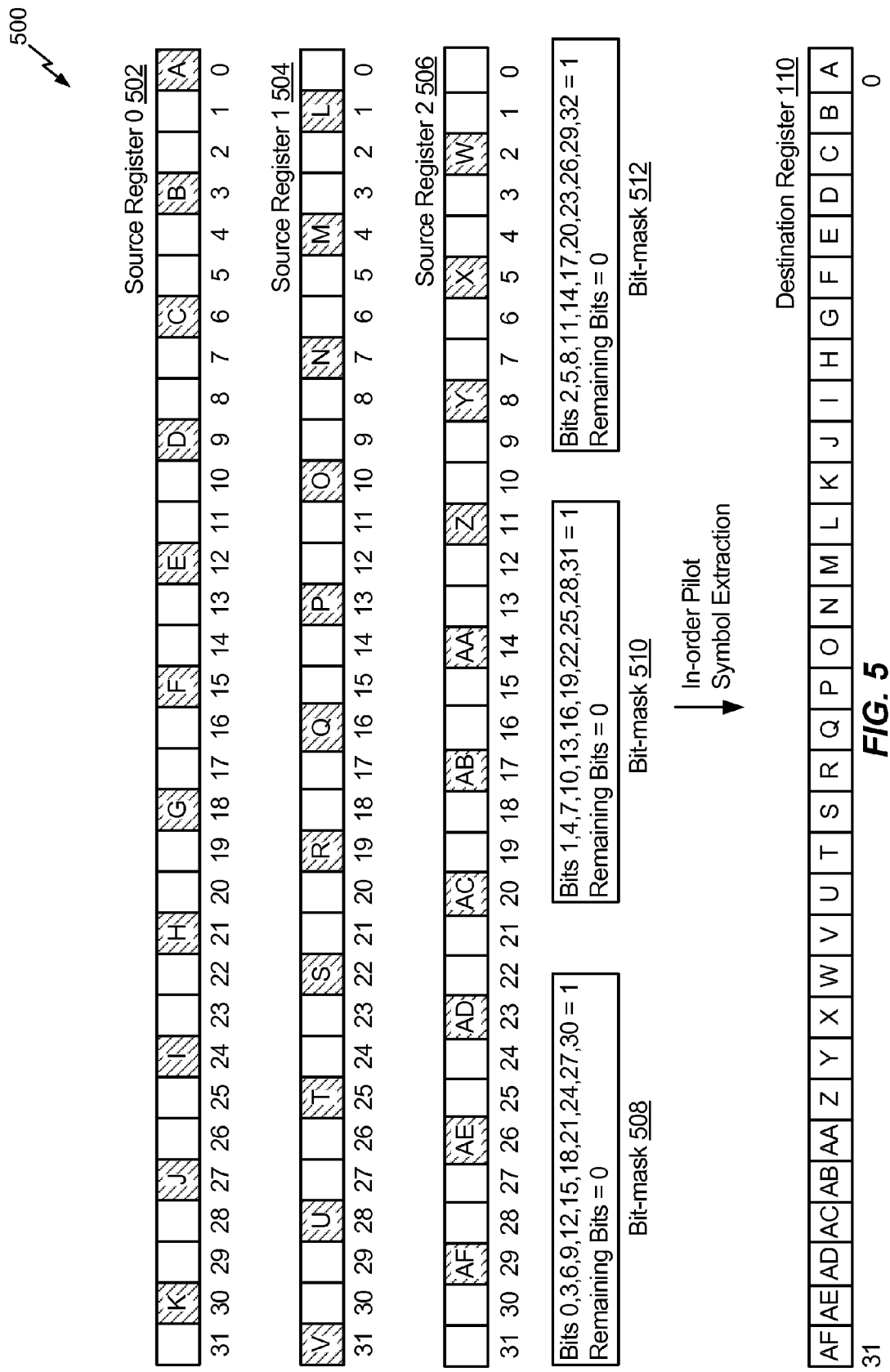
FIG. 5 is a block diagram of a particular illustrative embodiment of in-order extraction of data.
Figure 6:
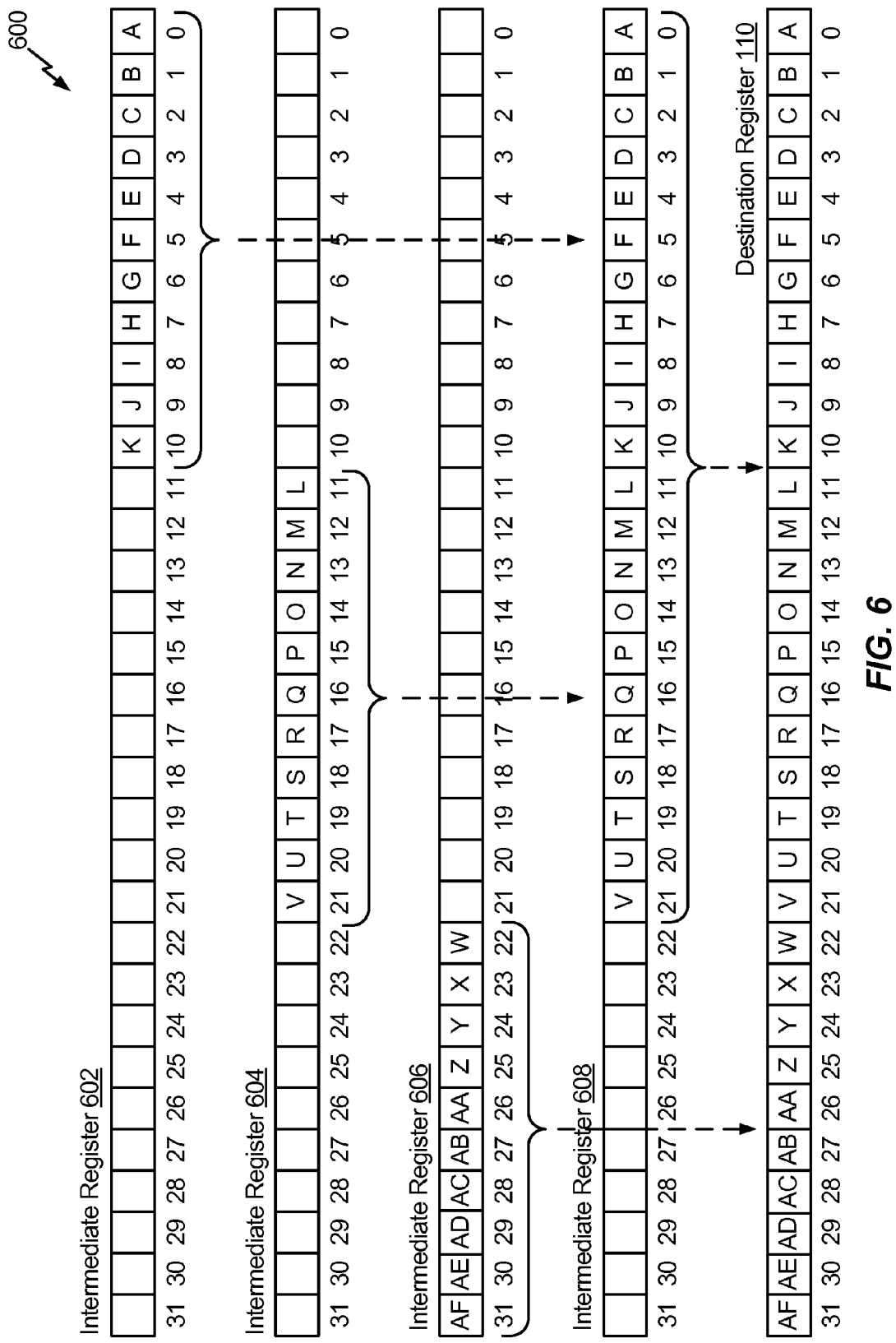
FIG. 6 is a block diagram of a particular illustrative embodiment of the in-order extraction of FIG. 5 with vector splicing using a plurality of bit-masks.
Figure 7:
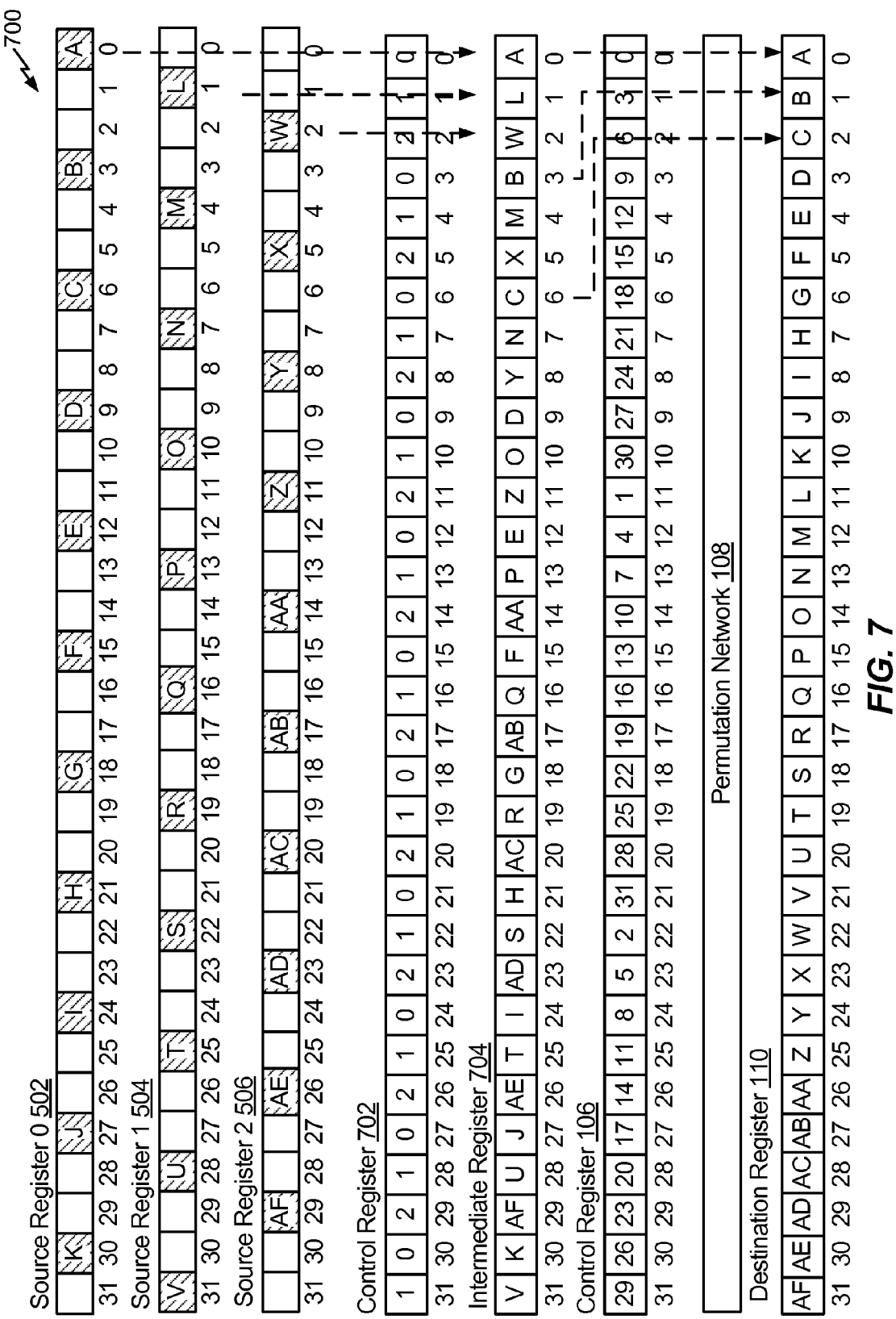
FIG. 7 is a block diagram of a particular illustrative embodiment of the in-order extraction of FIG. 5 with vector splicing using a second control register.

In a particular embodiment, the permutation network 108 may be used for data extraction from multiple registers based on a regular pattern (e.g., when the number of input data elements, output data elements, and the extraction pattern are known in advance). For example, FIGS. 5-6 are diagrams of operation at the vector processor 100 of FIG. 1 where data elements are extracted from multiple registers based on bit-masks 508, 510, and 512 using intermediate registers 602, 604, 606, and 608. As another example, FIG. 7 is a diagram of operation at the vector processor 100 of FIG. 1 where data elements are extracted from multiple registers based on control registers 702 and 106 using an intermediate register 704.

FIG. 5 illustrates an operation where data elements are extracted from multiple registers based on bit-masks and offsets, and is generally designated 500. During operation, data elements may initially be stored in multiple source registers. In the embodiment illustrated in FIG. 5, ninety-six data elements (e.g., samples) are stored in three source registers: source register 0 502, source register 1 504, and source register 2 506.

A bit-mask may indicate which portions of data elements are to be extracted from a corresponding source register, as explained above and as illustrated in FIGS. 2-4. The bit-mask may indicate that the data elements are to be extracted according to a regular pattern. As shown in FIG. 5, in the bit-mask 508, every third bit starting from bit 0 (i.e., bits 0, 3, 6, 9, ... 30) is set to 1 and the remaining bits are set to 0. That is, the bit-mask 508 indicates that every third data element starting from the data element at index 0 (i.e., data elements "A, B, ... K") of source register 0 502 is to be copied to the destination register 110. In the bit-mask 510, every third bit starting from bit 1 is set to 1 and the remaining bits are set to 0. Thus, the bit-mask 510 indicates that every third data element starting from the data element at index 1 (i.e., the data elements "L, M, ... V") of source register 1 504 is to be copied to the destination register 110. In the bit-mask 512, every third bit starting from bit 2 is set to 1 and the remaining bits are set to 0. Thus, the bit-mask 512 indicates that every third data element starting from the data element at index 2 (i.e., the data elements "W, X, ... Z, AA, ... AF") of source register 2 506 is to be copied to the destination register 110. In a particular embodiment, the illustrated bit-masks 508, 510, and 512 may be used to extract every third element of a received sequence of OFDM 4G LTE symbols to perform in-order pilot symbol extraction.

A permutation network (e.g., the permutation network 108 of FIG. 1) may populate the destination register 110 based on the bit-masks 508, 510, and 512, as shown. It will be noted that because the number of output samples (32) fills exactly one output register, the output samples may be written without the use of predicated stores. Such fixed extraction pattern-based processing may be executed in fewer processor cycles than when an arbitrary extraction pattern is used (e.g., as described with reference to FIG. 1). In a particular embodiment, the permutation network 108 may perform one or more splice operations to populate the destination register 110. For example, FIG. 6 illustrates an example of splice operations associated with the data extraction illustrated in FIG. 5 and is generally designated 600.

During operation, data elements may be copied from each of the source registers to a corresponding intermediate register. For example, the data elements "A ... K" are copied to the intermediate register 602, the data elements "L ... V" are copied to the intermediate register 604, and the data elements "W ... Z, AA ... AF" are copied to the intermediate register 606. The data elements "L ... V" are copied to a portion of the intermediate register 604 that does not overlap with a portion of the intermediate 602 to which data elements "A ... K" are copied. The data elements "W ... Z, AA ... AF" are copied to a portion of the intermediate register 606 that does not overlap with the portions of the intermediate registers 602 and 604, respectively. In a particular embodiment, the intermediate registers 602, 604, or 606 may also be a destination register for a permutation network. The permutation network may copy the data elements from the source register to the intermediate register based on a bit-mask and an offset as explained above and as illustrated in FIGS. 2-4, where the offset is used so that data elements are copied to non-overlapping positions.

The non-overlapping data elements in the intermediate register 602 and in the intermediate register 604 may be spliced into the intermediate register 608, which may be usable as a source register for a permutation network. The permutation network may splice contiguous non-overlapping data elements from multiple intermediate registers into another intermediate register by copying the data elements from each of the intermediate registers into the other intermediate register using a bit-mask and an offset, as explained above and as illustrated in FIGS. 2-4. The non-overlapping data elements from the intermediate registers 606 and 608 may be spliced into the destination register 110 to complete the in-order extraction.

In some implementations, fewer intermediate registers may be used for splicing. For example, the non-overlapping data elements in the intermediate register 602 and in the intermediate register 604 may be spliced into the intermediate register 602 or into the intermediate register 604 instead of being spliced into the intermediate register 608. Alternatively, in an embodiment where the permutation network supports simultaneous application of multiple bit-masks to multiple source registers, the permutation network may populate the destination register 110 as shown in a single splice operation (e.g., a multi-register splice or "super splice" operation). For example, FIG. 7 illustrates an operation in which data elements are extracted and spliced together from multiple registers and is generally designated 700. A single splice operation may include selecting the non-overlapping data elements and using the permutation network to populate the destination register 110 in a single instruction.

During operation, data stored in two or more registers may be spliced based on a control register. For example, data elements stored in source register 0 502, source register 1 504, and source register 2 506 may be spliced based on the control register 702 to populate the destination register 110 with the same data elements in the same order as illustrated in FIGS. 5-6. A value stored in the control register 702 may indicate which of the source registers 502, 504, or 506 is to be used to populate a location in a destination register (e.g., the intermediate register 704). An index of the value in the control register may indicate an index of the register that the data element is to be copied from as well as an index of the destination register. In the embodiment illustrated in FIG. 7, the control register 702 has a value 0 at index 3. The value 0 may indicate that the data element is to be copied from the source register 0 502. The index 3 may indicate that the data element to be copied is at index 3 of the source register 0 502 and is to be copied to index 3 of the intermediate register 704. Thus, the data element "B" is copied to index 3 of the intermediate register 704, as shown.

In a particular embodiment, after the data elements are copied to the intermediate register 704, another control register may be used to reorder the data elements. For example, as shown in FIG. 7, the control register 106 may be used to select the data elements in intermediate register 704 and to populate the destination register 110 with reordered data elements. The permutation network 108 may select data elements from the intermediate register 704 using the control register 106, as explained above and as illustrated in FIG. 1. In the embodiment illustrated in FIG. 7, the control register 106 has a value 3 at index 1. The value 3 may indicate that the data element at index 3 of the intermediate register 704 is to be copied. The index 1 may indicate that the data element may be copied to index 1 of the destination register 110. Thus, the data element "B" may be copied to index 1 of the destination register 110, as shown.

As shown in FIGS. 5-7, the vector processor 100 may generally be operable to deliver desired output samples to be extracted in a single instruction based on a specified extraction pattern. For example, such an instruction may be used to extract pilot tones according to a 4G LTE pilot extraction pattern.

Figure 8:
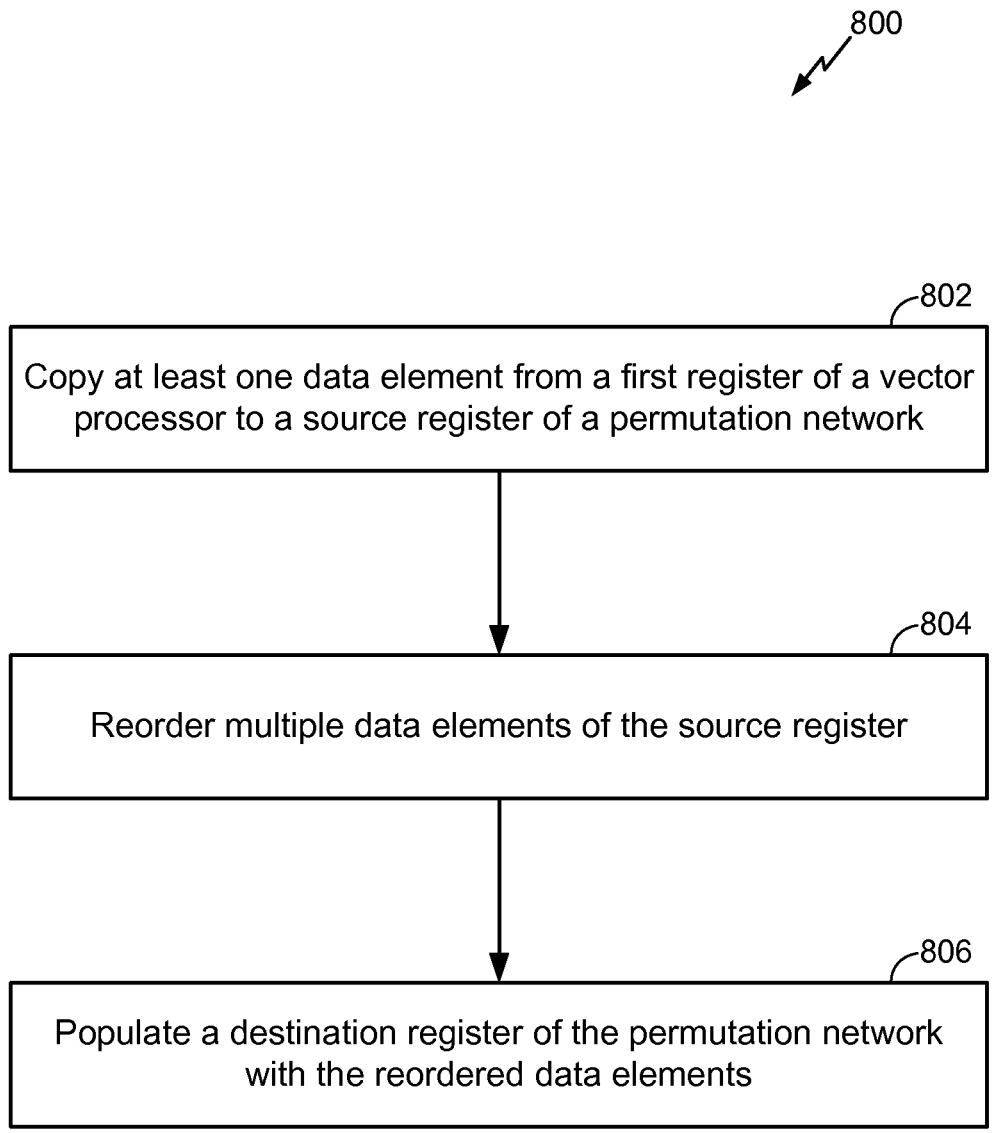
FIG. 8 is a flow chart of a particular illustrative embodiment of a method of data extraction in a vector processor.

FIG. 8 is a flow chart of a particular illustrative embodiment of a method 800 of data extraction in a vector processor. In an illustrative embodiment, the method 800 may be performed by the vector processor 100 of FIG. 1.

The method 800 may include copying at least one data element from a first register of a vector processor to a source register of a permutation network, at 802. For example, in FIG. 1, the data elements "a, b, c, . . . ad, ae, af" may be copied from the first register 102 to the source register 104 of the permutation network 108.

The method 800 may also include reordering multiple data elements of the source register, at 804, and populating a destination register of the permutation network with the reordered data elements, at 806. For example, in FIG. 1, the data elements "e" and "l" may be reordered from indexes 4 and 11 of the source register 104 into indexes 0 and 1 of the destination register 110, respectively.

Figure 9:
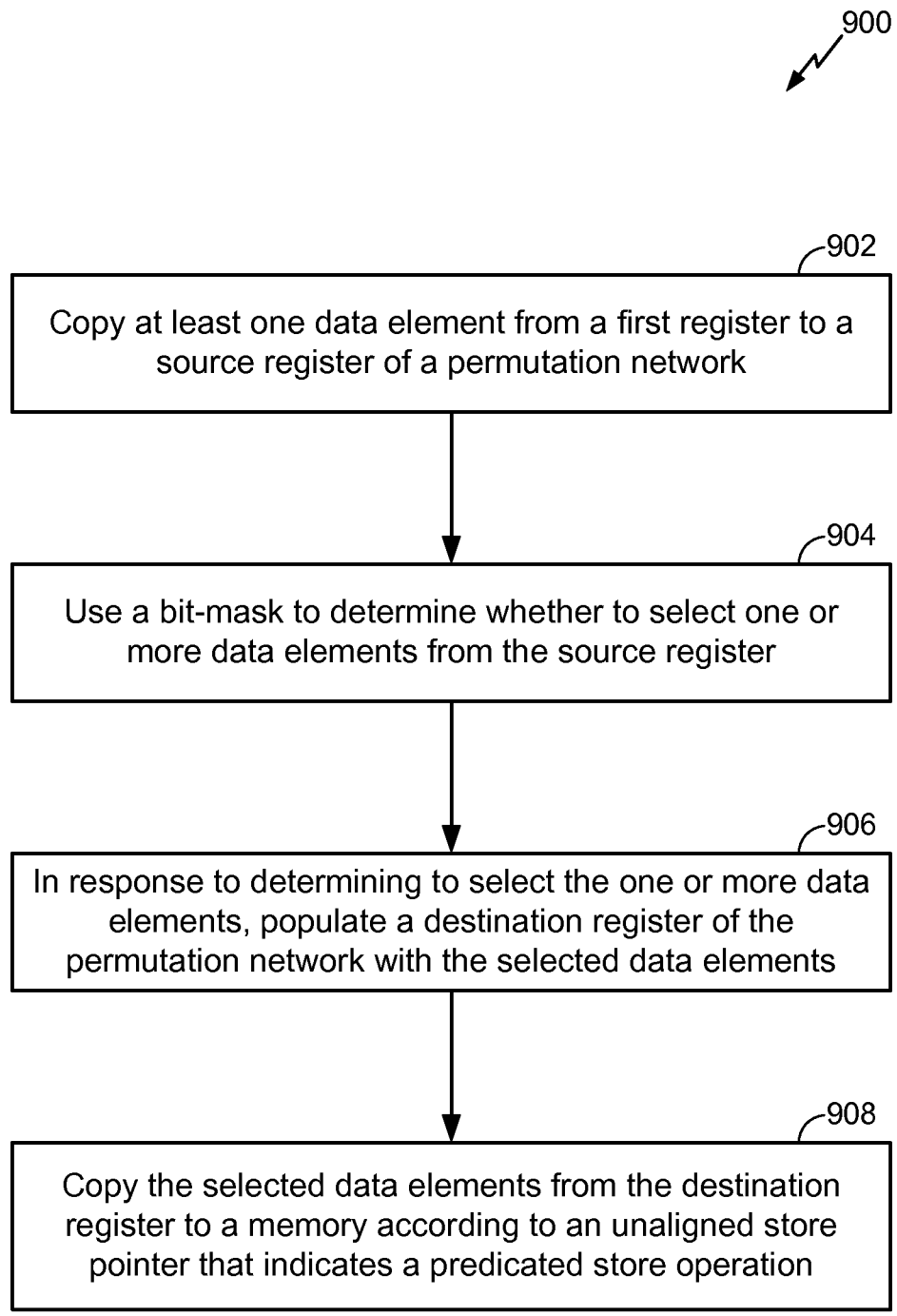
FIG. 9 is a flow chart of a second illustrative embodiment of a method of data extraction in a vector processor.

FIG. 9 is a flow chart of a second illustrative embodiment of a method 900 of data extraction in a vector processor. In an illustrative embodiment, the method 900 may be performed by the vector processor 100 of FIG. 1 and may be illustrated with reference to FIGS. 2-4.

The method 900 may include copying at least one data element from a first register to a source register of a permutation network, at 902. For example, in FIG. 3, the data elements "ag, ah, ai, . . . bk, bl" may be copied from the first register 102 to the source register 104 of the permutation network 108.

The method 900 may also include using a bit-mask to determine whether to select one or more data elements from the source register, at 904, and, in response to determining to select the one or more data elments, populating a destination register of the permutation network with the selected data elements, at 906. For example, in FIG. 3, the bit-mask 206 may be used to determine whether to select one or more data elements from the source register 104, and the selected data elements "ag, . . . aj, aw, . . . az, ba, . . . bh" may be copied to the destination register 110.

The method 900 may further include copying the selected data elements from the destination register to a memory according to an unaligned store pointer that indicates a predicated store operation, at 908. For example, in FIG. 3, the data elements "ag . . . aj, aw . . . az, ba . . . bd" may be copied from the destination register 110 to a first line in the memory 112 based on the store pointer 214 and the data elements "be . . . bh" may be copied from the destination register 110 to a next line in the memory 112 based on the next line store pointer 316.

Figure 10:
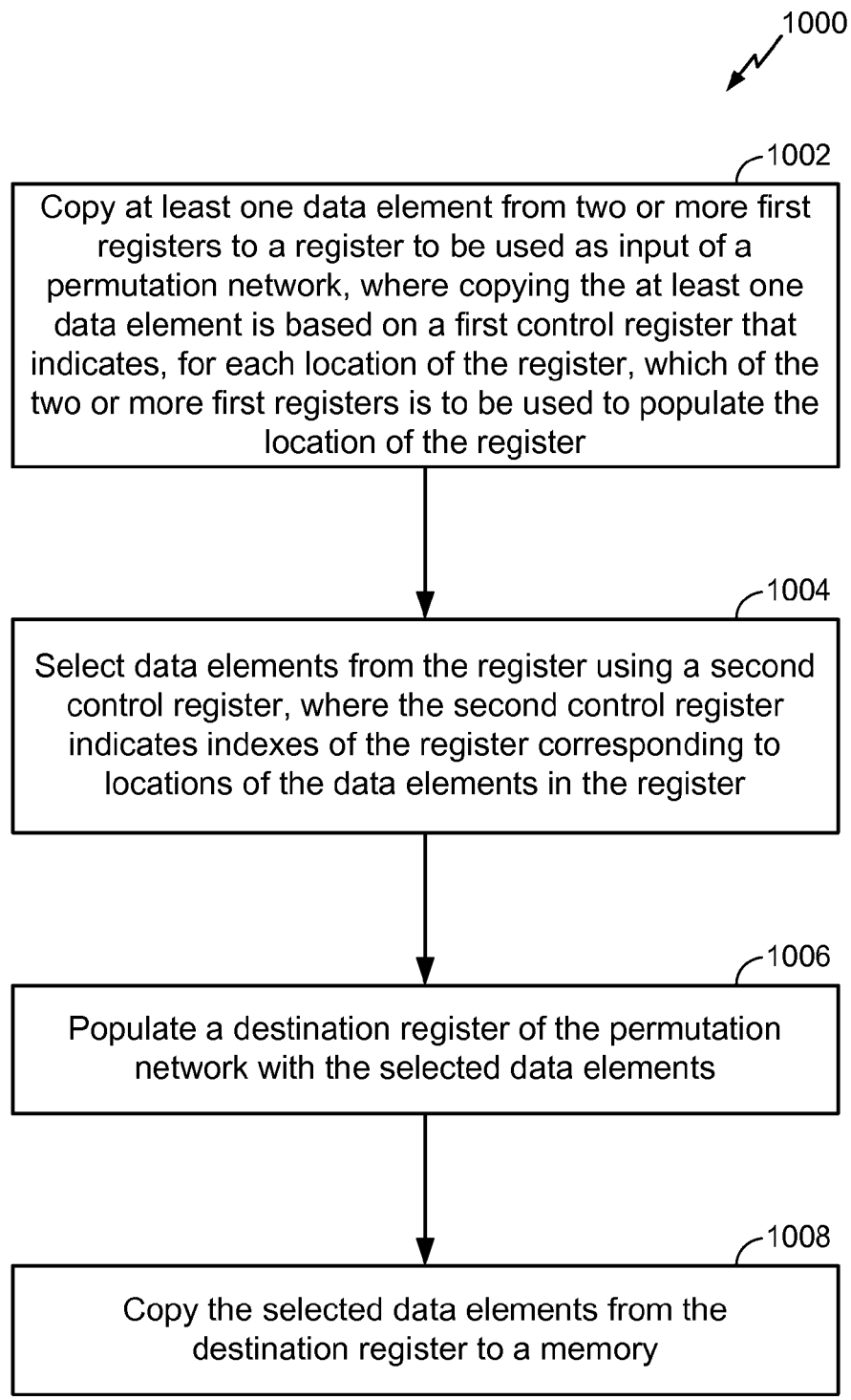
FIG. 10 is a flow chart of a third illustrative embodiment of a method of data extraction in a vector processor.

FIG. 10 is a flow chart of a particular illustrative embodiment of a method 1000 of data extraction in a vector processor. In an illustrative embodiment, the method 1000 may be performed by the vector processor 100 of FIG. 1.

The method 1000 may include copying at least one data element from two or more first registers to a register to be used as an input of a permutation network, where copying the at least one data element is based on a first control register that indicates, for each location of the register, which of the two or more first registers is to be used to populate the location of the register, at 1002. For example, in FIG. 7, the data element "B" may be copied from the source register 0 502 to index 3 of the intermediate register 704 based on the value "0" at index 3 of the control register 702. The intermediate register 704 may be used as input of the permutation network 108.

The method 1000 may also include selecting data elements from the register using a second control register, where the second control register indicates indexes of the register corresponding to locations of the data elements in the register, at 1004, and populating a destination register of the permutation network with the selected data elements, at 1006. For example, in FIG. 1, the control register 106 contains the value "3" at index 1. Thus, the data element "B" at index 3 of the intermediate register 704 is copied to index 1 of the destination register 110.

The method 1000 may further include copying the selected data elements from the destination register to a memory, at 1008. For example, in FIG. 1, the data element "B" is copied from the destination register 110 to the memory 112.

Figure 11:
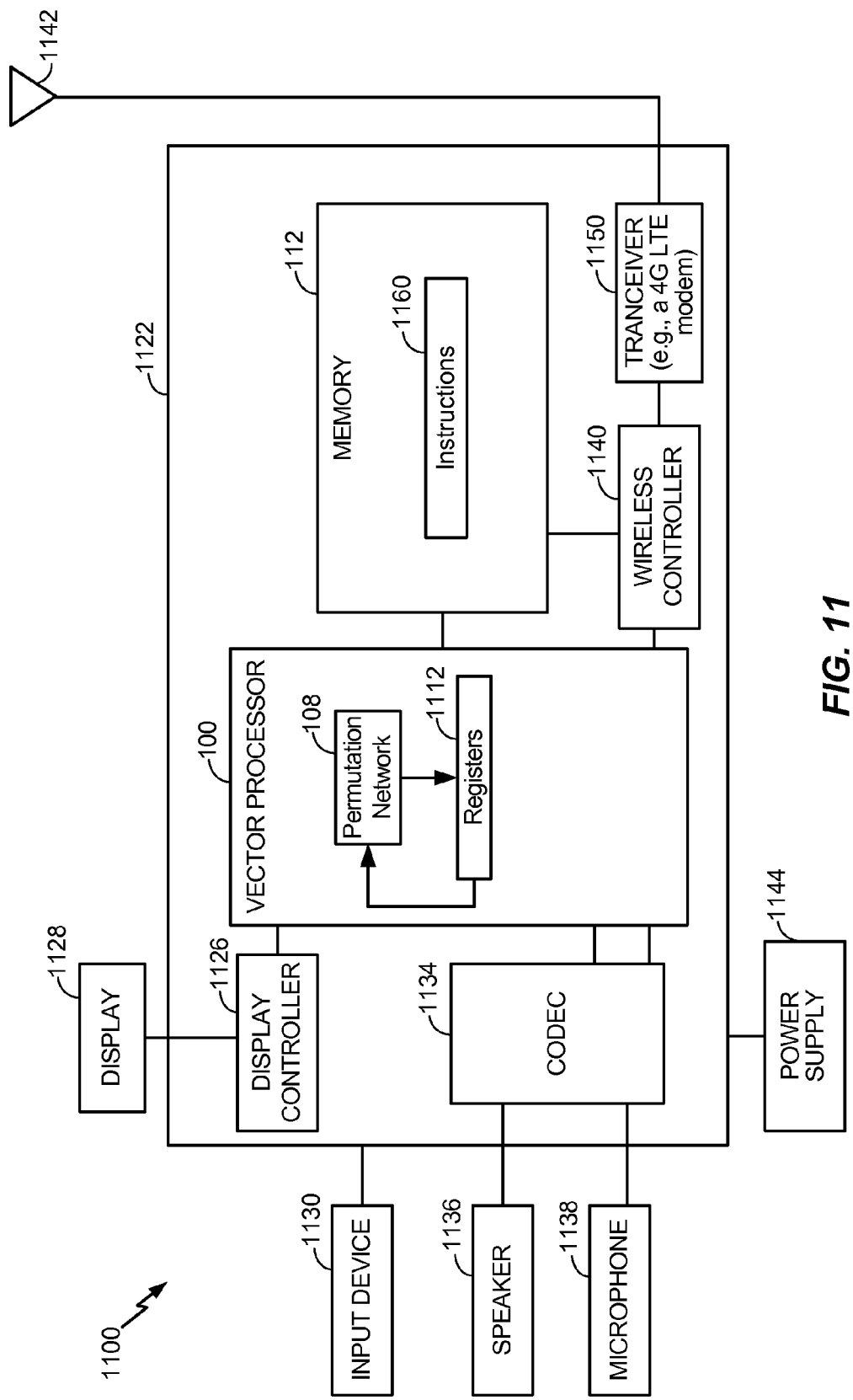
FIG. 11 is a block diagram of a wireless device including a vector processor with a permutation network such as the permutation network of FIG. 1.

Referring to FIG. 11, a block diagram of a particular illustrative embodiment of an electronic device including the vector processor 100 with the permutation network 108 is depicted and generally designated 1100. The vector processor 100 is coupled to a memory 112 and includes registers 1112. In an illustrative embodiment, the registers 1112 include the first register 102 of FIGS. 1-4, the source register 104 of FIGS. 1-4, the control register 106 of FIGS. 1 and 7, the destination register 110 of FIGS. 1-7, the bit-mask 206 of FIGS. 2-4, the offset 208 of FIGS. 2-4, the offset pointer 218 of FIGS. 2-4, the store pointer 214 of FIGS. 2-4, the next line store pointer 316 of FIGS. 3-4, the source register 0 502 of FIGS. 5 and 7, the source register 1 504 of FIGS. 5 and 7, the source register 2 506 of FIGS. 5 and 7, the bit-masks 508, 510, and 512 of FIG. 5, the intermediate registers 602, 604, 606, and 608 of FIG. 6, the control register 702 of FIG. 7, the intermediate register 704 of FIG. 7, or any combination thereof.

FIG. 11 also shows a display controller 1126 that is coupled to the vector processor 100 and to a display 1128. A coder/ decoder (CODEC) 1134 can also be coupled to the vector processor 100. A speaker 1136 and a microphone 1138 can be coupled to the CODEC 1134.

FIG. 11 also indicates that a wireless controller 1140 can be coupled to the vector processor 100 and, via a transceiver 1150 (e.g., a 4G LTE modem), to a wireless antenna 1142. In a particular embodiment, the vector processor 100, the display controller 1126, the memory 112, the CODEC 1134, and the wireless controller 1140 are included in a system-in-package or system-on-chip device 1122. In a particular embodiment, an input device 1130 and a power supply 1144 are coupled to the system-on-chip device 1122. Moreover, in a particular embodiment, as illustrated in FIG. 11, the display 1128, the input device 1130, the speaker 1136, the microphone 1138, the wireless antenna 1142, and the power supply 1144 are external to the system-on-chip device 1122. However, each of the display 1128, the input device 1130, the speaker 1136, the microphone 1138, the wireless antenna 1142, and the power supply 1144 can be coupled to a component of the system-on-chip device 1122, such as an interface or a controller.

In an illustrative embodiment, the vector processor 100 and/or components thereof may be operable to perform all or a portion of the operations and methods described with reference to FIGS. 1-10. The memory 112 may store instructions 1160 that are executable (e.g., by the vector processor 100) to perform all or a portion of the operations and methods described with reference to FIGS. 1-10. For example, the antenna 1142 may receive a sequence of 01-DM 4G LTE symbols and the received symbols may be stored as data elements in a first register of the registers 1112. Portions of the stored data elements, for example corresponding to pilot tones, may be selected and reordered by the permutation network 108 based on a control register, a bit-mask, or any combination thereof. The reordered data elements may be stored to the memory 112.

In conjunction with the described embodiment, an apparatus is disclosed that includes means for copying at least one data element to a source register of a permutation network. For example, the means for copying may include the vector processor 100 of FIGS. 1 and 11 or component(s) thereof, one or more other devices or circuits configured to copy at least one data element to a register, or any combination thereof.

The apparatus includes means for reordering multiple data elements of the source register. For example, the means for reordering may include the permutation network 108 of FIGS. 1-4, 7, and 11 or component(s) thereof, one or more other devices or circuits configured to reorder multiple data elements of a register, or any combination thereof.

The apparatus includes means for populating a destination register of the permutation network with the reordered data elements. For example, the means for populating the destination register may include the permutation network 108 of FIGS. 1-4, 7, and 11 or component(s) thereof, one or more other devices or circuits configured to populate a register, or any combination thereof.

The apparatus also includes means for copying the reordered data elements from the destination register to a memory. For example, the means for copying the reordered elements may include the vector processor 100 of FIGS. 1-4, 7, and 11 or component(s) thereof, one or more other devices or circuits configured to copy data elements to a memory, or any combination thereof.

The apparatus may also include means for storing a reordering pattern. For example, the means for storing the reordering pattern may include the control register 106 of FIGS. 1 and 6, the bit-mask 206 of FIGS. 2-4, the bit-masks 508, 510, and 512 of FIG. 5, the control register 702 of FIG. 7, the registers 1112 of FIG. 11, or component(s) thereof, one or more other devices or circuits configured to store a reordering pattern, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal. For example, one or more processors (or components thereof) configured to perform functionality described herein may be integrated into a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, a portable digital video player, a tablet computing device, or any combination thereof.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method of data extraction in a vector processor, the method comprising:
    copying at least one data element to a source register of a permutation network;

reordering multiple data elements of the source register based on values stored in a control register, wherein each of the values indicates bit position of one of the data elements in the source register;

populating a destination register of the permutation network with the reordered data elements; and copying the reordered data elements from the destination register to a memory.

2. The method of claim 1, wherein each of the data elements corresponds to a byte, a half-word, a word, or a double-word of data.

3. The method of claim 1, wherein the vector processor is included in a transceiver comprising a fourth generation (4G) long term evolution (LTE) modem.

4. The method of claim 1, wherein the permutation network comprises a plurality of multiplexers, and wherein each multiplexer is configurable to copy data from a location of the source register to a different location in the destination register.

5. The method of claim 1, wherein execution of a single instruction includes copying the at least one data element to the source register, reordering the multiple data elements of the source register, populating the destination register with the reordered data elements, and copying the reordered data elements from the destination register to the memory, and wherein copying the at least one data element to the source register includes splicing contiguous non-overlapping portions of data elements from two or more registers into the source register.

6. The method of claim 5, wherein the data elements from the two or more registers are selected according to a regular pattern.

7. The method of claim 1, wherein a control register indicates, for each location of the destination register, which of the reordered data elements is to be used to populate the location of the destination register.

8. The method of claim 1, further comprising storing the reordered data elements in the memory by performing an aligned store.

9. A method of data extraction in a vector processor with aligned memory, the method comprising:

using a bit-mask to determine whether to copy a data element, from a source register of a permutation network to a destination register of the permutation network; and in response to determining to copy the data element to the destination register, copying the data element from the destination register to a memory according to an unaligned store pointer that indicates a predicated store operation.

10. The method of claim 9, wherein a particular bit in the bit-mask corresponds to a particular location in the source register, and wherein, for each bit in the bit-mask, a data element at the corresponding location in the source register is copied to the destination register when the bit has a first value.

11. The method of claim 9, wherein the unaligned store pointer indicates an offset to mask a partial store of the copied data element.

12. The method of claim 11, further comprising filling the data element into the destination register at a position higher than or equal to an offset position and filling another data element into the destination register at a position lower than the offset position, wherein an offset pointer indicates the offset position of the destination register corresponding to the offset.

13. The method of claim 12, wherein the predicated store operation includes:

a first store operation that copies the data element located at the positions higher than or equal to the offset position to a first line of an aligned memory; and a second store operation that copies the other data element located at the position lower than the offset position to a next line of the aligned memory.

14. The method of claim 9, further comprising:

using a second bit-mask to determine whether to copy one or more second data elements from a second register;

in response to determining to copy the one or more second data elements, populating the destination register of the permutation network with the one or more second data elements; and copying the one or more second data elements from the destination register to a memory.

15. The method of claim 14, wherein populating the destination register with the data element and with the one or more second data elements includes:

copying the data element from the source register to a first intermediate register at a first portion of the first intermediate register;

copying the one or more second data elements from the second register to a second intermediate register at a second portion of the second intermediate register, wherein the first and second portions are non-overlapping; and splicing the first portion of the first intermediate register and the second portion of the second intermediate register into the destination register.

16. A method of data extraction in a vector processor, the method comprising:

copying at least one data element from two or more first registers to a register to be used as an input of a permutation network, wherein copying the at least one data element is based on a first control register that indicates, for each location of the register, which of the two or more first registers is to be used to populate the location of the register;

selecting data elements of the register using a second control register, wherein the second control register indicates indexes of the register corresponding to locations of the data elements in the register;

populating a destination register of the permutation network with the selected data elements; and copying the selected data elements from the destination register to a memory.

17. The method of claim 16, wherein a position of a particular index in the second control register indicates a position of a corresponding data element in the destination register.

18. A non-transitory computer-readable medium storing instructions that, when executed by a processor, cause the processor to:

copy at least one data element to a source register of a permutation network;

reorder multiple data elements of the source register based on values stored in a control register, wherein each of the values indicates bit position of one of the data elements in the source register;

populate a destination register of the permutation network with the reordered data elements; and copy the reordered data elements from the destination register to a memory.

19. The non-transitory computer-readable medium of claim 18, wherein the at least one data element corresponds to a pilot tone, and wherein the reordering is based on a long term evolution (LTE) pilot extraction pattern.

20. An apparatus comprising:
   means for copying at least one data element to a source register of a permutation network;
   means for reordering multiple data elements of the source register based on values stored in a control register, wherein each of the values indicates bit position of one of the data elements in the source register;
   means for populating a destination register of the permutation network with the reordered data elements; and
   means for copying the reordered data elements from the destination register to a memory.

21. The apparatus of claim 20, further comprising means for storing a reordering pattern.

22. An apparatus comprising:
   a source register configured to receive at least one data element;
   a control register;
   a destination register; and
   a permutation network configured to:
      reorder multiple data elements of the source register based on values stored in the control register, wherein each of the values indicates bit position of one of the data elements in the source register; and
      populate the destination register with the reordered data elements.

23. The apparatus of claim 22, further comprising a control register, wherein the reordering is performed using the control register.

24. The apparatus of claim 22, wherein the permutation network comprises a plurality of multiplexers, wherein each multiplexer is configurable to copy data from a location of the source register to a different location in the destination register.

25. The apparatus of claim 24, wherein the permutation network is integrated into a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, a portable digital video player, a tablet computing device, or any combination thereof.

26. The method of claim 1, further comprising:
   determining an updated store pointer based on copying other data elements to the memory, wherein the reordered data elements are copied to memory locations of the memory based on the updated store pointer; and
   determining an offset pointer based on the updated store pointer, wherein the reordered data elements are populated to positions in the destination register based on the offset pointer.

* * * * *